Nov. 20, 1945.   G. E. KING   2,389,367
CONTROL SYSTEM
Filed June 27, 1944   2 Sheets-Sheet 1

WITNESSES:
E. A. McCloskey
C. H. Oberheim

INVENTOR
George E. King.
BY
Paul E. Friedemann
ATTORNEY

Nov. 20, 1945.   G. E. KING   2,389,367
CONTROL SYSTEM
Filed June 27, 1944   2 Sheets-Sheet 2

WITNESSES:
E.A.M°Closkey.
E.H. Obelheim.

INVENTOR
George E. King.
BY
Paul E. Friedemann
ATTORNEY

Patented Nov. 20, 1945

2,389,367

UNITED STATES PATENT OFFICE 2,389,367

CONTROL SYSTEM

George E. King, Swissvale, Pa., assignor to Westinghouse Electric Corporation, East Pittsburgh, Pa., a corporation of Pennsylvania Application June 27, 1944, Serial No. 542,403

8 Claims. (Cl. 172—179)

The present invention relates to variable voltage control systems, and more particularly to electric motor control systems for automatically controlling the operation of motors used to drive machine tool elements, paper mills and the like, elevators, electrically operated shovels, etc.

This invention provides certain improvements in variable voltage control systems in which rotating regulators are employed to regulate a given quantity and the invention as hereinafter described and as illustrated in the drawings is specifically directed to the regulation of the speed of rotation of a direct-current motor. However, it will be apparent to one skilled in the art that the invention is not limited to speed regulation alone, since various modifications of the system may be made to control the motor torque or power. It will further be apparent that the invention is not necessarily limited to motor control since automatic regulation of the voltage, current, or electrical power supplied to an electrical load of substantially any type susceptible of regulation may be had.

The improvements provided by the present invention, insofar as simplicity and increased efficiency of operation are concerned, in motor control systems, for example, of the type disclosed in applicant's Patent No. 2,205,204, are readily apparent. In general, such systems comprise a direct-current motor, a main generator connected in series circuit relation with the motor, a regulating generator for controlling the electrical output of the main generator in response to a changing motor characteristic which it is desired to regulate and an exciter for supplying electrical energy to the motor generator system or some portion thereof, depending upon the electrical arrangement of the component parts.

The regulating generators used in such systems are generally provided with a field winding energized proportionally to the motor current, a field winding energized proportionally to the motor armature terminal voltage and differentially related to the current energized field, the differential magnetomotive force of the voltage and current energized fields is indicative of the counter E. M. F. of the motor and hence indicates the speed of the motor, and two field windings each connected in series with a control field winding for the main generator. The series connected regulating generator and main generator field windings are usually arranged in opposite legs of a conventional bridge circuit having resistors in the remaining two opposite legs and the regulating generator armature is connected across the output terminals of the bridge. The input terminals of the bridge circuit are connected to a suitable source of direct current which may be varied to control the excitation of the main generator control fields and in view of the series connection of the two regulating generator fields with the two main generator control fields the same exciting current from the external source flows therethrough. The differential magnetomotive force of the voltage and current energized regulating generator fields are opposed to the magnetomotive force resulting from the external excitation of the two regulating generator fields in the bridge circuit. Thus when the motor is operating at a proper speed as indicated by the excitation of the main generator control fields the total flux in the regulating generator is zero. The regulating generator armature winding by reason of its connection in the bridge circuit is in such circuit relation with its two field windings in the bridge circuit that the generator is substantially self energizing and may therefore have an electrical output independent of the external excitation of its two windings in the bridge circuit, or of its voltage and current energized windings. Thus upon a departure in balance of the mentioned differential magnetomotive force against the magnetomotive force of the two regulating generator bridge circuit windings, an output of the regulating generator is fed into the bridge circuit in a direction to correct the existing unbalance. When a balance in the regulating generator windings is again reached this generator maintains the corrective current necessary to keep such balance until a further disturbance occurs.

A principal object of this invention is to simplify the design of a regulating generator employed in a variable voltage control system.

Another object of this invention is to reduce the heating effect in a regulating generator of the type mentioned.

Still another object of this invention is to reduce the size and manufacturing cost of a regulating generator of the character described.

A specific object of this invention is to reduce the number of control field windings in a regulating generator, to one.

Another specific object of this invention is to provide in a variable voltage system including a regulating generator provided with but one control field winding, certain circuit arrangements whereby the control field winding is energized only during periods during which the quantity to be controlled departs from a predetermined value and at all other times is deenergized.

Still another specific object of this invention is to provide a variable voltage control system including a regulating generator having a single control field winding in which the control field winding is energized by an electrical quantity which is the resultant of a plurality of electrical quantities properly combined to produce such a resultant electrical quantity indicative of a condition to be controlled.

Other objects and advantages will become apparent from a study of the following specification, when considered in conjunction with the accompanying drawings, in which.

Figure 1:
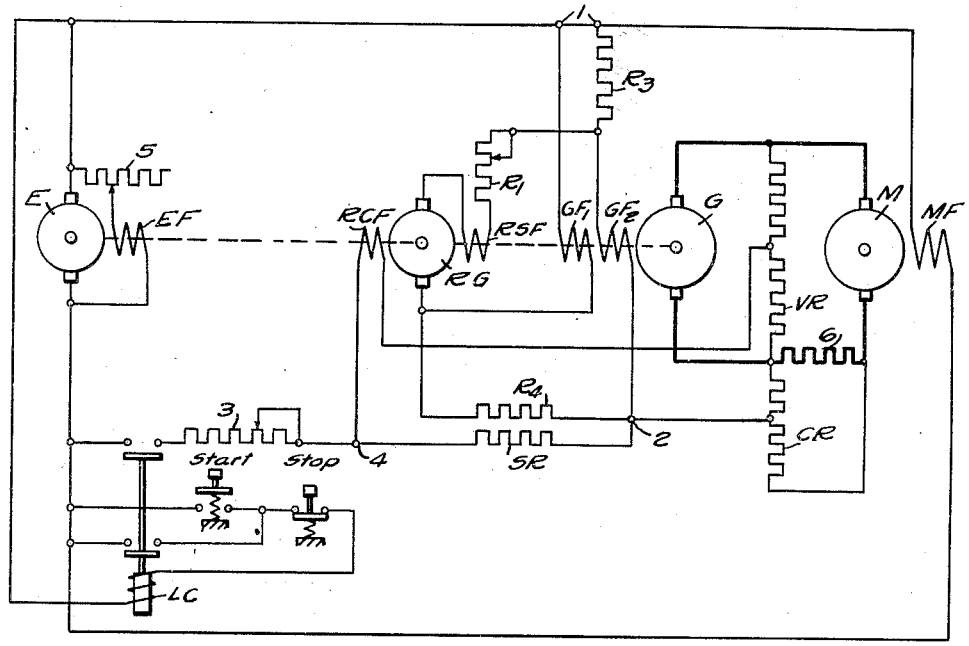
Figure 1 is a schematic drawing of a direct-current variable voltage control system embodying the principles of this invention.
Figure 2:
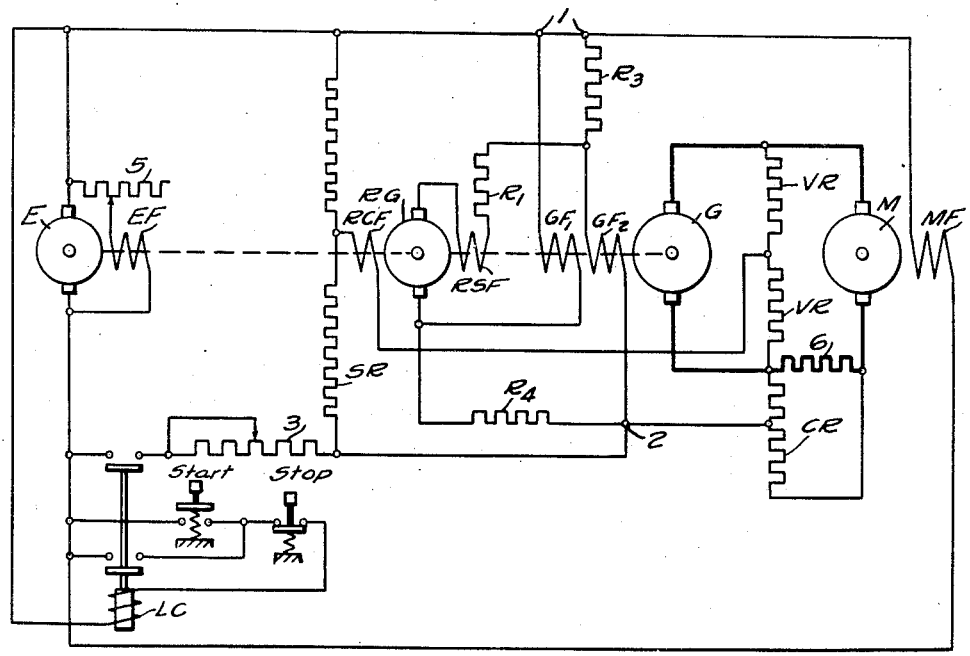
Fig. 2 is a schematic diagram of a modification of the invention illustrated in Fig. 1.

In Figs. 1 and 2 of the drawings, the regulating generator is provided with a series field winding and the regulating generator armature and the series field winding are connected in series with an adjustable resistor $R_1$, across the galvanometer terminals of a conventional electrical bridge circuit, which comprises in two opposite legs thereof the main generator field windings $GF_1$ and $GF_2$ and in the remaining opposite legs the bridge balancing resistors $R_3$ and $R_4$. The bridge is supplied with electrical energy from a suitable source such as the exciter E.

Figure 3:
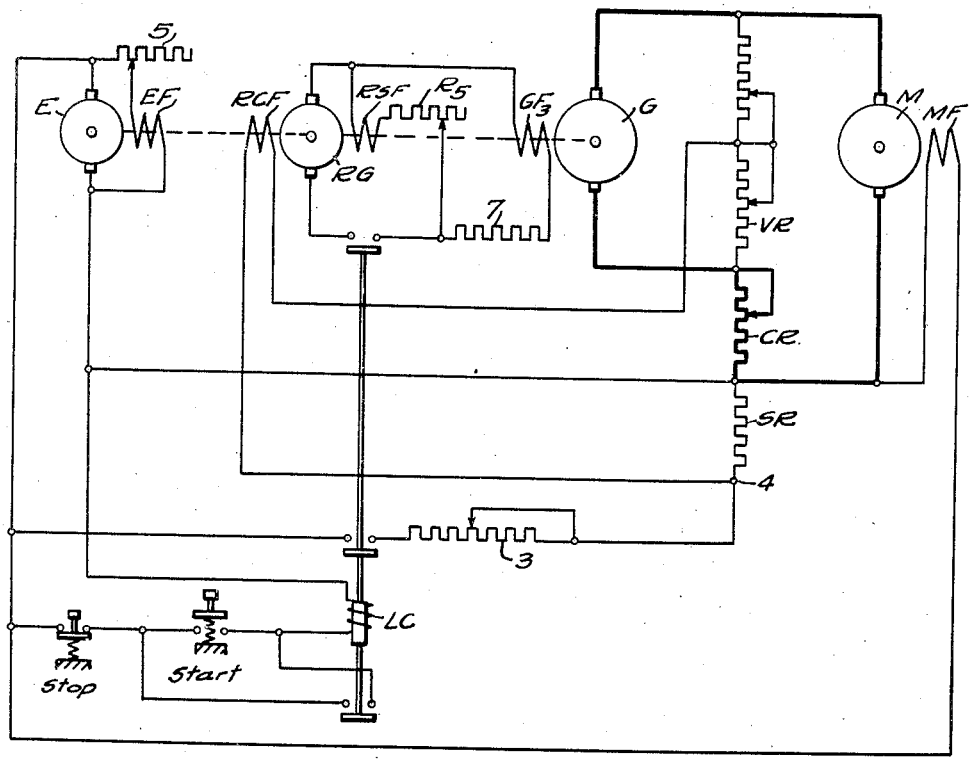
Fig. 3 is a schematic diagram illustrating a still further modification of the invention illustrated in Fig. 1.

In Fig. 3, the armature winding of the regulating generator RG is connected in a series circuit with the generator field winding $GF_3$ and hence supplies all the electrical energy for exciting the main generator to the normal predetermined value.

Figure 4:
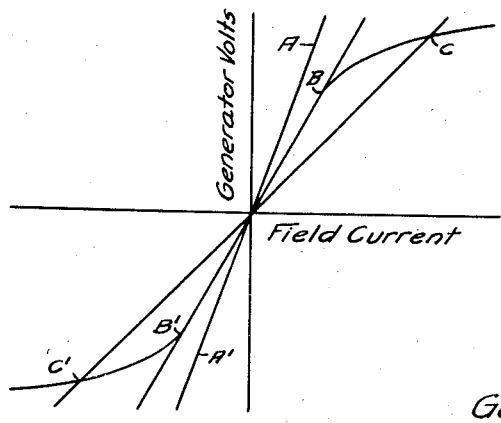
Fig. 4 is a curve illustrating certain features of the invention.

In each of the two regulating generator circuit arrangements mentioned above, that is the bridge circuit type of Figs. 1 and 2 and the series type of Fig. 3, the regulating generator is preferably provided with operating characteristics which, while unfavorable from an operating point of view insofar as a machine such as the main generator G is concerned, are most favorable for the regulating generator. Normally, stable operation of a direct-current generator is obtainable only if the slope of the resistance line of the field circuit is less than that of a line tangent to the initial substantially straight line portion of the no-load saturation curve as shown in Fig. 4. If the resistance is less, the generator can have an open-circuit voltage which is determined by the intersection C or C' of the resistance line with the saturation curve. If the resistance is higher, as indicated by the resistance line A or A' the generator voltage cannot build up. If the slope of the resistance line just equals the slope of the saturation curve, that is, is tangent to the saturation curve, the generator can theoretically have an open-circuit voltage equal to any of the points of tangency, for example, points B or B'. It is the latter of the three mentioned conditions for which the regulating generator is preferably adjusted. The control field winding for the regulating generator, by reason of its connections in the system, locates the proper operating point of this generator along the tangent curve and keeps this operating point constant for any setting of the speed controlling rheostats indicated in each of the three figures of the drawings, as 3. In addition, in the case of Fig. 3, the regulating generator supplies the required power, that is, all the exciting current in addition to the regulating current to the field winding $GF_3$ of the main generator G.

Referring now to Fig. 1 of the drawings, the variable voltage system illustrated comprises a direct-current motor M, the speed of which is to be maintained constant over a wide range of variable speeds, a main generator G, the armature winding of which is connected in series circuit relationship with the armature winding of the motor M. A regulating generator RG which controls the electrical output of the main generator G and an exciter E which forms a source of constant direct-current potential for energizing the motor generator system.

The motor M is provided with a separately excited field winding MF which is connected directly across the terminals of the exciter. The main generator G is provided with two like field windings $GF_1$ and $GF_2$ which are cumulatively connected and which, together with the resistors $R_3$ and $R_4$, are connected to form a conventional electrical bridge circuit in which the two field windings are connected in opposite legs and the two resistors are connected in the remaining two opposite legs. The input terminals of the electrical bridge circuit indicated by the numerals 1 and 2 are connected across the exciter E and the excitation supplied to the bridge circuit is regulated by the speed control rheostat 3 connected in series in the conductor connecting the terminal 2 with one side of the exciter.

The regulating generator RG is provided with a series connected field winding RSF and a control field winding RCF. The armature winding of this generator, the series field winding RSF and an adjustable series resistor $R_1$ are connected across the galvanometer terminals of the electrical bridge circuit. This resistor $R_1$ is preferably of such a value when adjusted to obtain the desired tangent relationship of the resistance line of the regulating generator field circuit, with the no-load saturation curve as previously explained, that the total voltage across the galvanometer circuit is zero for a predetermined operating condition. Control field winding RCF of the regulating generator is connected across the resistors SR, VR and CR by a circuit which may be traced from junction point 4, field winding RCF, resistor VR, a portion of resistor CR, bridge circuit input terminal 2 and resistor SR to the junction point 4.

The exciter E is provided with a shunt connected self-energizing field winding EF, the excitation of which is regulated by the series resistor 5.

Since the speed of the motor is to be regulated, an indication of the counter voltage of the motor is desired. This is obtained by connecting the resistor circuit including the resistor VR across the series circuit connecting the motor and generator and by connecting the resistor CR in shunt circuit with the resistor 6 which is connected in series in the motor generator series circuit. The resistor CR may be connected in series in the motor-generator circuit as shown in Fig. 3. In this manner the resistor VR has applied thereacross a voltage proportional to the motor armature terminal voltage and the resistor CR has a drop thereacross proportional to the load current of the motor armature. These resistors are so arranged that the voltage thereacross are in electrical opposition and by properly selecting the ohmic values of these resistors so that for normal operating conditions, that is, when the motor is operating at a speed indicated by the setting of the speed control rheostat 3, the voltage drop across VR is greater than the voltage drop across CR, a differential voltage results which is an indication of the speed of the motor. The resistors are so connected that this resultant voltage is in opposition to the voltage drop across the resistor SR which serves as a standard of comparison for the resultant voltage of the resistors VR and CR since the voltage drop across the resistor SR, it being connected in series with the speed control rheostat 3 and having the bridge circuit current flowing therethrough, is an indication of the speed at which the motor is to operate. Thus, by properly selecting the values of the resistor SR with respect to the resistors VR and CR, when the motor is operating at the proper speed as indicated by the setting of the speed control rheostat, the resulting voltage of the resistor VR and CR may be made to balance the voltage drop across the resistor SR. As a result, the total voltage applied across the control field RCF is zero and no current flows therethrough.

Should the motor speed, for example, tend to decrease due to an increasing torque loading thereof, the current in the motor armature circuit begins to rise at the same time the armature terminal voltage tends to slightly decrease. These changing conditions cause the voltage across the resistor CR to increase while that across the resistor VR tends to decrease and as a result the differential or resultant voltage of the resistors is measurably reduced and no longer matches in opposition the voltage drop across the standard of comparison resistor SR. Thus a current flows through the control field winding RCF in such a direction as to increase the electrical output of the regulating generator and produce an unbalance of potential across the bridge circuit galvanometer terminals of such polarity that the electrical output of the regulating generator increases the excitation of the generator field windings GF$_1$ and GF$_2$. Thus the supply of electrical energy to the motor is increased to a point where the voltages of the resistor network are again balanced at which time the motor speed is matched with the setting of the speed control rheostat.

Should the motor speed tend to increase, it will be apparent that the resultant voltage may eventually overbalance the drop across the resistor SR and the control field RCF is reversely excited. The electrical output of the regulating generator thus, in a sense, is in opposition to the flow of current through the main generator field windings GF$_1$ and GF$_2$ and hence decreases the flow of current therethrough to, in turn, decrease the electrical output of the main generator and thus reduce the speed of the motor. When the motor speed is again matched with the rheostat speed setting, the self-energizing properties of the regulating generator maintain the necessary corrective current to hold the speed of the motor at the selected point.

The modification of the invention illustrated in Fig. 2 is in principle the same as that of Fig. 1. The only difference resides in the positioning of the standard resistor SR which is now removed from its series connection in the rheostat circuit and connected in a resistor circuit across the input terminals 1 and 2 of the bridge circuit. As so placed, the resistor SR has a voltage drop thereacross which is proportional to the voltage applied across the terminals of the bridge circuit and, hence, has a voltage drop thereacross which is an indication of the desired speed of the motor. The field winding RCF is connected in the same manner as in Fig. 1, completely across the resistor circuit including the resistors SR, VR and CR. Since the circuits of Figs. 1 and 2 are similar except for the noted change, like reference numerals have been applied to like parts and the descriptive material relating to Fig. 1 is equally applicable here.

In Fig. 1, the resistor SR by reason of its connection in series circuit with the electrical bridge circuit and thus in effect in series with the main generator field windings GF$_1$ and GF$_2$ has currents flowing therethrough, which may change only as fast as the currents circulating in the main generator field windings. There are applications, for example, wherein the motor operates reciprocating machine tool elements, wherein a faster change of current may be desired in order to obtain more rapid changes of acceleration. For such applications the embodiment of Fig. 2 may probably be the more preferable since the resistor SR is sensitive only to the potential applied across the bridge circuit. In Fig. 2, it will be noted that when the line contactor LC closes, a voltage will appear across the resistor SR instantly. Thus the voltage of the resistor SR is not dependent upon the rate of change of currents in the main generator field windings. In fact, this voltage will be higher at the first instant, which is desirable, and will then decrease and become proportional to the voltage drop across the bridge after the main generator field windings come up to operating potential. This will cause the voltage of the regulating generator to build up rapidly and force the generator fields during accelerating periods. It is possible by proper design to take advantage of this forcing action to obtain rapid acceleration and braking.

The modification of the invention illustrated in Fig. 3 provides again the same basic principle of control of the regulating generator. The resistors VR and CR as before respectively have voltage drops thereacross proportional to the motor armature terminal voltage and the load current of the motor armature. The resistor SR in this instance is connected in series with the speed regulating rheostat 3 across the conductors connecting the motor field winding MF across the exciter. Speed regulation in this instance is obtained by changing the setting of the rheostat 3 and thereby changing the voltage drop across resistor SR.

In Fig. 3, the main generator G has but one field winding GF$_3$ which with the series resistor 7 is connected directly across the regulating generator armature winding. The resistor 7 is primarily a calibrating resistor. A shunt field winding in series with an adjustable resistor R$_5$ is connected across the regulating generator armature terminals. Resistor R$_5$ as in the case of the resistor R$_1$ of Figs. 1 and 2 is provided for properly adjusting the field circuit of the regulating generator RG to produce the tangent relationship of the field resistance line and the initial straight line portion of the generator saturation curve. The control field winding RCF is connected completely across the resistors VR, CR and SR as before.

It should be noted that a series field winding would function just as well as the shunt field RSF. The shunt connected field winding is preferred, however since adjustments of the resistor $R_5$ in the shunt circuit do not disturb the resistance characteristics of the circuit including the resistor 7.

Since the main generator field winding $GF_3$ is directly connected across the regulating generator and now has no other source of excitation as in Figs. 1 and 2, it is apparent that the regulating generator must supply, in addition to its regulating voltage, a voltage sufficient to operate the motor at the speed indicated by the setting of the speed control rheostat 3. Since the resistor SR is connected in series with the speed control rheostat 3 across the exciter, the voltage drop thereacross is varied according to the setting of the speed control rheostat 3 and hence an indication of the selected speed of operation of the motor. Thus the operating voltage of the regulating generator necessary to maintain the selected motor speed is determined by the action of the control field winding RCF as determined by the voltages applied thereto by the voltage unbalance of the resistors. Any change from the selected speed immediately produces a corrective voltage output of the regulating generator exactly in the same manner as described in connection with Fig. 1.

The regulating action of the system of Fig. 3, like that of Fig. 2, is very fast since the voltage drops across the resistor SR are changed substantially instantaneously with a change of the rheostat setting.

Control means for effecting reversals of operation of the motor M have not been included in the drawings for the purpose of simplicity. Such additions would in no way alter the principles of the invention and are believed to be well within the scope of ordinary engineering skill. It will also be apparent that various other arrangements of the resistors controlling the excitation of the control field winding RCF to sense only voltage changes or only current changes may be had without departing from the scope of the teachings of this invention.

From the foregoing, it is apparent that a relatively simple and positive control of a quantity to be regulated has been provided and one which represents a measurable improvement in the efficiency of operation of the regulating generator over that, for example, disclosed in the hereinbefore mentioned patent. The provision of a single control field winding and the novel resistor network for controlling the excitation of the field winding so that it is energized only during periods when the regulated quantity departs from a selected value effects a measurable reduction in heating and makes possible a reduction in the size of the machine thereby decreasing the manufacturing costs. Further, since the control field winding is used only for regulating purposes and is not differentially connected with respect to other windings, as in the case of the previously mentioned regulating generator, the field winding may be small in size and require less exciting current, thus further reducing the possibility of overheating even under the worst conditions.

The foregoing disclosure and the showings made in the drawings are merely illustrative of the principles of this invention and are not to be interpreted in a limiting sense. The only limitations are to be determined from the scope of the appended claims.

I claim as my invention:

1. In a system of control for a direct current motor having an armature winding and a field winding, the combination of, a main generator having an armature winding and a pair of field windings, circuit means electrically connecting the armature winding of said generator and the armature winding of said motor in series circuit relationship, an electrical bridge circuit, said pair of generator field windings being connected in opposite legs of the electrical bridge circuit, electrical resistance means connected in the remaining opposite legs of the bridge circuit for electrically balancing the bridge circuit, a regulating generator having an armature winding, a series field winding and a separately excited field winding, a resistor connected in series with the series field winding and armature winding, said armature winding, series field winding and series resistor being connected across the output terminals of said bridge circuit, a source of constant direct current potential for energizing the motor field winding and said bridge circuit, means for producing a voltage proportional to the motor armature voltage, means for producing a voltage proportional to the motor armature current, means for producing a voltage proportional to the electrical energy supplied to the electrical bridge circuit from said source, circuit means interconnecting the voltage producing means, and circuit means connecting the separately excited field winding of said regulating generator across said voltage producing means.

2. In a system of control for a direct current motor having an armature winding and a field winding, the combination of, a main generator having an armature winding and a pair of field windings, circuit means electrically connecting the armature winding of said generator and the armature winding of said motor in series circuit relationship, an electrical bridge circuit, said pair of generator field windings being connected in opposite legs of the electrical bridge circuit, electrical resistance means connected in the remaining opposite legs of the bridge circuit for electrically balancing the bridge circuit, a regulating generator having an armature winding, a series field winding and a separately excited field winding, a resistor connected in series with the series field winding and armature winding, circuit means connecting said armature winding, series field winding and series resistor across the output terminals of said bridge circuit, a source of constant direct current potential for energizing the motor field winding and said bridge circuit, means for producing a voltage proportional to the motor armature voltage, means for producing a voltage proportional to the motor armature current, means for producing a voltage proportional to the electrical energy supplied to the electrical bridge circuit from said source, circuit means interconnecting the voltage producing means and connecting two of the voltage producing means in electrical opposition, and circuit means connecting the separately excited field winding of said regulating generator across said voltage producing means.

3. In a system of control for a direct current motor, the combination of, a main generator for supplying electrical energy to said motor, a regulating generator for controlling the electrical energy output of the main generator, field winding means for the regulating generator, a source of electrical energy for energizing the motor generator system, a first resistor connected to have a voltage applied thereacross proportional to the voltage across said motor, a second resistor connected to have a current flowing therethrough proportional to the current flowing through said motor, a third resistor connected to have a current flowing therethrough proportional to the electrical current energizing said system, circuit means interconnecting the first, second and third resistors such that a resultant voltage is produced indicative of a change in speed of the motor, and circuit means interconnecting the field winding means of the regulating generator such that said resultant voltage is applied across said field winding means.

4. In a system of control for a direct current motor, the combination of, a main generator for supplying electrical energy to said motor, a regulating generator for controlling the electrical energy output of the main generator, field winding means for the regulating generator, a source of electrical energy for energizing the motor generator system, a first resistor connected to have a voltage applied thereacross proportional to the voltage across said motor, a second resistor connected to have a current flowing therethrough proportional to the current flowing through said motor, a third resistor connected to have a current flowing therethrough proportional to the electrical current energizing said system, circuit means connecting the first and second resistors such that the voltages across each are in opposition, circuit means connecting the third resistor in additive relationship with one of the first and second resistors, and circuit means connecting the field winding means of the regulating generator with said resistors such that said field winding means is energized by the resultant voltage of said resistors.

5. In a system of control for a direct current motor, the combination of, a main generator for supplying electrical energy to said motor, a regulating generator for controlling the electrical energy output of the main generator, field winding means for the regulating generator, a source of electrical energy for energizing the motor generator system, a first resistor connected to have a voltage applied thereacross proportional to the voltage across said motor, a second resistor connected to have a current flowing therethrough proportional to the electrical current energizing said system, a third resistor connected to have a voltage applied thereacross proportional to the voltage applied to said system by said source of electrical energy, circuit means interconnecting the first, second and third resistors such that a resultant voltage is produced indicative of a change in speed of the motor, and circuit means interconnecting the field winding means of the regulating generator such that said resultant voltage is applied across said field winding means.

6. In a system of control for a direct current motor, the combination of, a main generator for supplying electrical energy to said motor, a regulating generator for controlling the electrical energy output of the main generator, field winding means for the regulating generator, a source of electrical energy for energizing the motor generator system, a first resistor connected to have a voltage applied thereacross proportional to the voltage across said motor, a second resistor connected to have a current flowing therethrough proportional to the current flowing through said motor, a third resistor connected to have a voltage applied thereacross proportional to the voltage applied to said system by said source of electrical energy, circuit means connecting the first and second resistors such that the voltages across each are in opposition, circuit means connecting the third resistor in additive relationship with one of the first and second resistors, and circuit means connecting the field winding means of the regulating generator with said resistors such that said field winding means is energized by the resultant voltage of said resistors.

7. In a system of control for a direct current motor having an armature winding and a field winding, the combination of, a main generator having an armature winding and a field winding, circuit means connecting the armature winding of said generator and the armature winding of said motor in series circuit relationship, a regulating generator having an armature winding and a field winding, circuit means connecting said armature winding of said regulating generator in series circuit relationship with the field winding of said generator, a source of electrical energy for energizing the motor field winding means for producing a voltage proportional to the voltage across the motor armature, means for producing a voltage proportional to the current flowing through the motor armature winding, means for producing a voltage proportional to the voltage in said motor field winding, circuit means interconnecting the voltage producing means such that a resultant voltage is produced proportional to the change in speed of said motor, and circuit means connecting said field winding of the regulating generator across the voltage producing means.

8. In a system of control for a direct current motor having an armature winding and a field winding, the combination of, a main generator having an armature winding and a field winding, circuit means connecting the armature winding of said generator and the armature winding of said motor in series circuit relationship, a regulating generator having an armature winding and a field winding, circuit means connecting said armature winding of said regulating generator in series circuit relationship with the field winding of said generator, a source of electrical energy for energizing the motor field winding, means for producing a voltage proportional to the voltage cross the motor armature, a first resistor connected to have a voltage applied thereacross proportional to the voltage across the armature winding of said motor, a second resistor connected to have a current flowing therethrough proportional to the current in the armature winding of the motor, a third resistor connected to have a voltage applied thereacross proportional to the voltage applied across the motor field winding, circuit means connecting the first and second resistors in electrical opposition, circuit means connecting the third resistor and one of the first and second resistors in additive relationship and circuit means connecting the field winding of the regulating generator across the connected resistors such that said field winding has applied thereacross a voltage corresponding to the resultant voltage of the resistor voltages.

GEORGE E. KING.